Sept. 22, 1931.  F. S. HARTWELL  1,824,543
BORING BAR
Filed Dec. 28, 1926  2 Sheets-Sheet 1
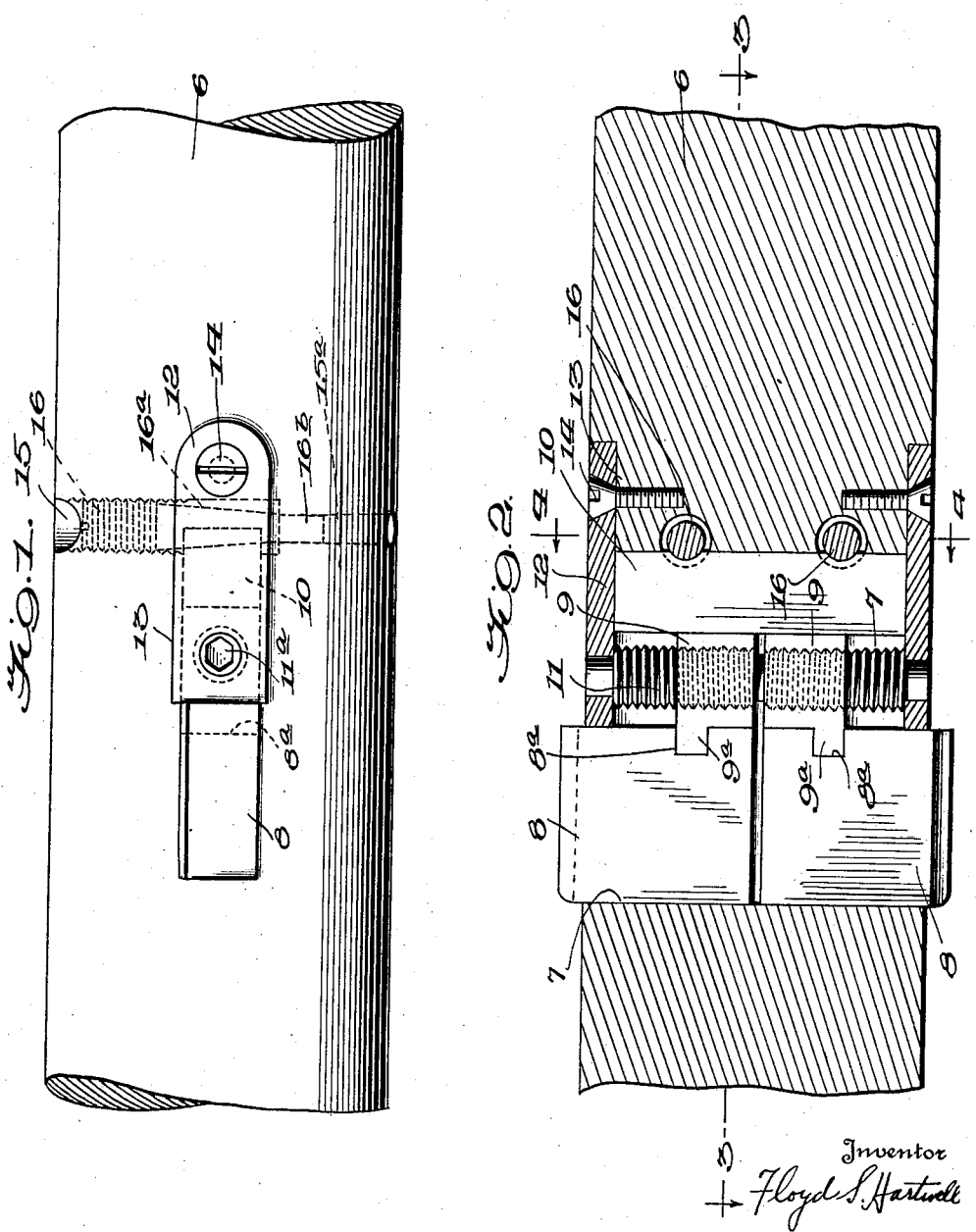
Inventor
Floyd S. Hartwell
By Milo B. Stevens Co
Attorneys

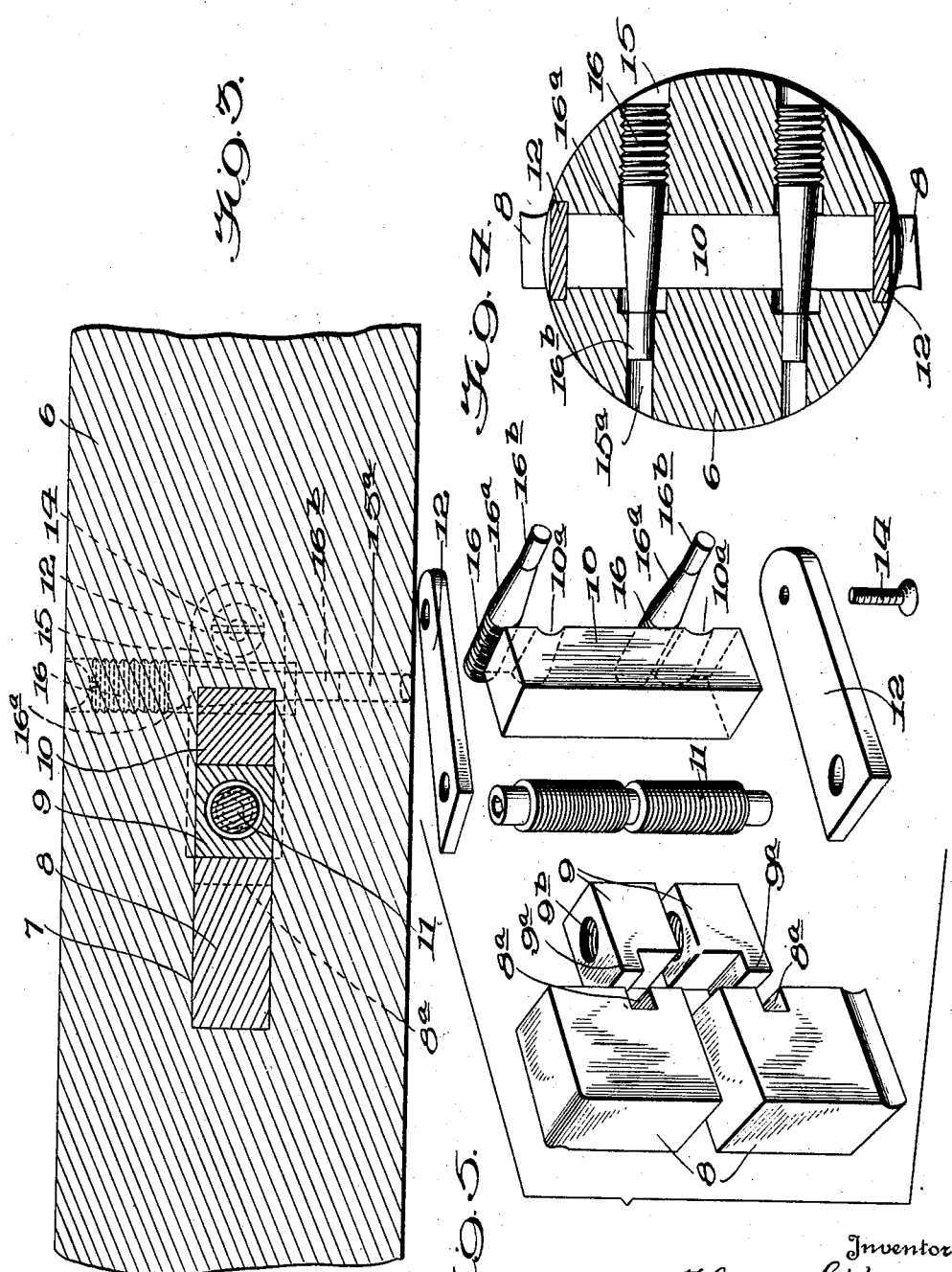

Patented Sept. 22, 1931

1,824,543

UNITED STATES PATENT OFFICE

FLOYD S. HARTWELL, OF CLEVELAND, OHIO

BORING BAR

Application filed December 28, 1926. Serial No. 157,572.

My invention relates to expansion boring tools and particularly to such as are known as boring bars.

The matter of providing an adequate cutter adjusting means for expansion boring bars, without necessitating a housing slot or recess of such size as to materially weaken the bar at the site of the cutters, has always been a stumbling block for tool makers, and particularly so in the smaller sizes of bars. Boring bars are subjected to heavy torsional strain at the cutter-sites, and when the bar is equipped with initially acting roughing cutters followed by finishing cutters, it will be evident that the heavy uneven cut of the roughing cutters creates a very substantial torque load that has to be met by the weakened cross section of the bar which carries the finishing cutters. Attempts to overcome the cross sectional weakness of the bar at the cutters by materially reducing the size of the bar slot and cutter adjusting means have met with manufacturing and other drawbacks. Specifically, the proposed adjusting means have involved an unnecessary number of working parts which are difficult to produce in small sizes, hard to assemble, and more or less unreliable in practical use.

It is, therefore, the primary object of my invention to overcome the aforenoted objections and to provide a boring bar in which the arrangement of the blades and the holding and adjusting means therefor is such that a substantial reduction in the size of the opening or openings for the reception of these parts is made possible whereby the strength of the bar adjacent the cutting units will compare favorably with the strength of the bar elsewhere; also to furnish a greatly simplified cutter adjusting and holding means which incorporates a minimum number of parts which may be manufactured in small sizes without loss of efficiency, thereby adapting the device for the smallest sizes of boring bars without materially weakening the same.

Another object of the invention is the provision in a boring bar of an adjusting and holding means for the cutters which is so formed and arranged that it may be positioned directly in the cutter carrying slots of the bar, and when so positioned functions to directly support the cutters.

The foregoing and other objects, to be referred to later, are attained by means of a novel combination and arrangement of parts to be hereinafter described and claimed and in order that the same may be better understood, reference is had to the accompanying drawings forming a part of this specification. The drawings illustrate what I now regard as a preferred embodiment of the invention, but it is to be understood that various changes and modifications may be made therein without departing from the spirit and scope of the subject matter claimed.

In the drawings, wherein the same reference characters designate the same parts in all views, Figure 1 is an elevation of a boring bar in fragmentary form illustrating the application of the invention;

Figure 2 is a longitudinal sectional view through the same;

Figure 3 is a section on the line 3—3 of Figure 2;

Figure 4 is a cross section on the line 4—4 of Figure 2; and

Figure 5 is a group perspective view of the elements constituting the adjusting and holding means.

Referring specifically to the drawings, numeral 6 denotes a portion of a boring bar which has a transverse slot 7, as usual for receiving the cutters 8. As best illustrated in Figure 2, the slot 7 is somewhat wider than the cutters 8 to accommodate the cutter adjusting blocks 9 and their locking bar 10, these elements having a snug sliding fit in the slot.

The drawings illustrate a bar having a pair of finishing cutters 8 and an adjusting and holding block 9 for each. However it is to be understood, of course, that the invention is capable of expression in a bar having but one cutter, the specific number of cutters or sets of cutters being immaterial.

Referring to Figures 2 and 5 it is observed that the adjusting and holding blocks 9 are of rectangular form, each being provided with a projecting lug 9a snugly engaging in an edge notch of the associated cutter 8. Each block 9 is formed with a transverse bore 9b, the bore of one block being cut with right hand threads and the other with left hand threads to take in the correspondingly threaded portions of an adjusting screw 11 extending through the blocks. The ends of the screw 11 are journalled in carrying plates 12 having a light drive fit in longitudinally extending rectangular recesses 13 cut in the surface of the bar.

As will be appreciated, the arrangement of the recesses 13 is such that the plates 12 serve the additional function of closing the slots 7 adjacent the cutters 8, the ends of the plates 12 bearing against the adjacent edges of the cutters to maintain the opposite edges thereof in sliding engagement with the proximate slot wall. However, it is pointed out that the adjusting blocks 9 and their associated locking bar 10 constitute the major supporting instrumentality for the cutters 8. This is evident from an inspection of Figure 2, since it is seen that the opposed surfaces of the blocks 9 are in flat contact with the locking bar 10 and the edges of the cutters 8, respectively. Furthermore, the ends of the lugs 9a flatly engage the back walls of the cutter notches 8a.

From the construction described, it is manifest that an entirely adequate and satisfactory bearing will be provided for the block-engaged edges of the cutters 8 without subjecting the screw journal plates 12 to unusual strain.

In carrying out the invention, the ends of the adjusting screw 11 may have an angular socket 11a for the application of an Allen wrench when it is desired to adjust the cutters 8. However, any other equivalent formation of the screw ends may be resorted for the engagement of an operating implement.

The locking bar 10, as hereinbefore intimated is designed to lock the cutters 8 in a predetermined adjusted position. To this end the back surface of the bar 10 which engages the adjacent end wall of the slot 7 is cut with rounded transverse grooves 10a tapering in the direction of one end. These locking bar grooves 10a, preferably two in number, register with transverse bores 15 extending through the bar 6 and opening into the cutter slot 7 thereof. The bores 15 are threaded at one end to receive the threaded outer ends of adjusting screws 16, having intermediate shank portions 16a tapering in frustro conical fashion in the direction of their reduced cylindrical ends 16b which are received and guided in the diametrically reduced end portions 15a of the bores 15. On tightening the screws 16 their tapered portions 16a wedge into the correspondingly tapered locking-block grooves 10a forcing the locking-block 10 against the adjusting blocks 9 and the latter into binding contact with the cutters 8 to hold them in a set position. Of course but slight movement of the locking block 10 and adjusting blocks 9 is necessary to lock the cutters, it being remembered that the adjusting blocks 9 have a normal bearing contact with both the locking bar 10 and the cutters 8. Upon actuation of the locking bar 10 to effective position the very slight transverse play in the threads of the adjusting blocks 9 and their feed screw 11 allows the blocks to bind the cutters in place in addition to so binding the blocks on the feed screw as to prevent turning of the latter.

Assembly of the cutter adjusting parts in the bar slot 7 is simple. The cutters 8 are first introduced into the slot followed by the adjusting blocks 9, duly mounted on their feed screw 11. When applying the adjusting blocks 9 to the oppositely threaded ends of feed screw 11, care must be taken to see that both blocks take in the screw threads at the same time, as otherwise the blocks will not occupy the same relative position and one cutter will be projected a greater distance from the bar than the other. The adjusting block lugs 9a, having been engaged with their respective cutter notches 8a, the locking bar 10 is put in place and its adjusting and holding screws 16 inserted in the boring bar holes 15 to engage the tapered edge recesses 10a of the locking bar. Plates 12 are now applied.

It will be seen that the holding and adjusting elements are of the same thickness as the cutters and that these parts are arranged directly behind the cutters in normal supporting or bearing contact therewith and with the opposite wall of the cutter slot. By this structure a single slot of minimum width serves to accommodate the cutters and their supporting and adjusting elements. Thus, the strength of the boring bar at the site of the cutters compares favorably with the strength of the bar elsewhere. Furthermore the carrying plates 12 of the block adjusting screw 11 are relieved of practically all strain when the tool is in use.

Having thus described my invention what I claim as new and desire to secure by Letters Patent is:

1. A boring bar having a slot and a pair of cutters therein, an adjusting block for each of said cutters and carried in said slot, the blocks operatively engaging and flatly contacting against one edge of their respective cutters, a backing member engaging one wall of said slot and having a plane, unobstructed opposite side surface acting through flat contact with said adjusting blocks for slidably retaining said cutters against the opposite slot wall, a screw having oppositely threaded end portions, said adjusting blocks being operatively mounted upon the respective ends of said screw, removable plates carried at opposite sides of said bar and in which the ends of said screw are journalled, said plates engaging opposite ends of said backing member to center the same and hold it against shifting endwise in said slot, the ends of plates bearing against the cutters and comprising an auxiliary sustaining means therefor, said plates being arranged to close the said slot adjacent said cutters whereby to removably confine said screw, adjusting blocks and backing member in said slot, said plates having openings whereby access may be had to said screw for turning the same to adjust said cutters, and wedge screws carried by said bar, said wedge screws being disposed transversely of and acting through said backing member and adjusting blocks for holding the cutters in a set position, and the rear edge of said backing member having recesses adapted to receive said screws.

2. A boring bar having a slot and a cutter therein, sustaining means for the cutter comprising an adjusting block operatively and flatly engaged therewith, a removable backing member within said slot and bearing against said adjusting block and having its opposite surface bearing against the adjacent wall of said slot, means acting through said backing member and said adjusting block for locking said cutter in a set position, auxiliary bar-carried sustaining means for said cutter and acting independently of said last named means for holding said backing member in said slot, said boring bar and backing member having recesses for receiving said locking means, and said auxiliary bar carried sustaining means engaging said removable backing member to hold said recesses in alignment.

3. A boring bar having a shoulder and an adjustable cutter bearing against said shoulder, a sustaining and adjusting block operatively engaging said cutter, a backing and sustaining member for said adjusting block and removably carried by said bar to permit disengagement of said adjusting block from said cutter, said backing and sustaining member acting through said adjusting block for sustaining said cutter against said shoulder, means for actuating said backing member to lock said cutter in a set position, auxiliary bar-carried cutter sustaining means removably carried by said bar and positioned to prevent removal of said backing member, said last-named means being independent of said backing member-actuating means, said boring bar and backing member having means cooperating to provide a seat for said actuating means, and said auxiliary cutter sustaining means engaging opposite ends of said backing member to hold the seating portions of the bar and backing member in registry.

In testimony whereof I affix my signature.

FLOYD S. HARTWELL.